Oct. 9, 1928.
F. W. SLACK
1,686,578
MOTOR SUPPORT OR SUSPENSION
Filed July 6, 1926
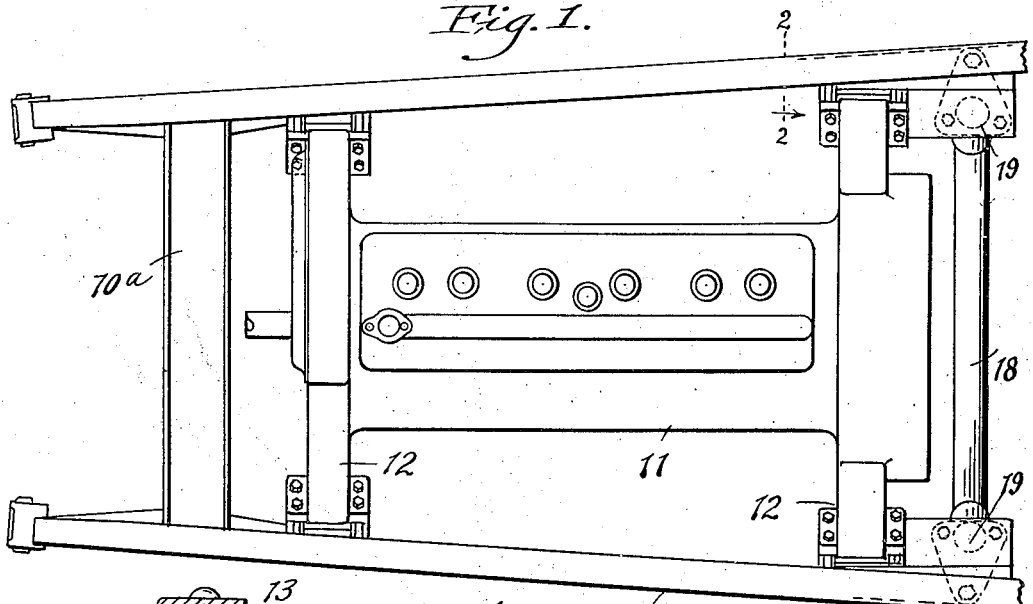
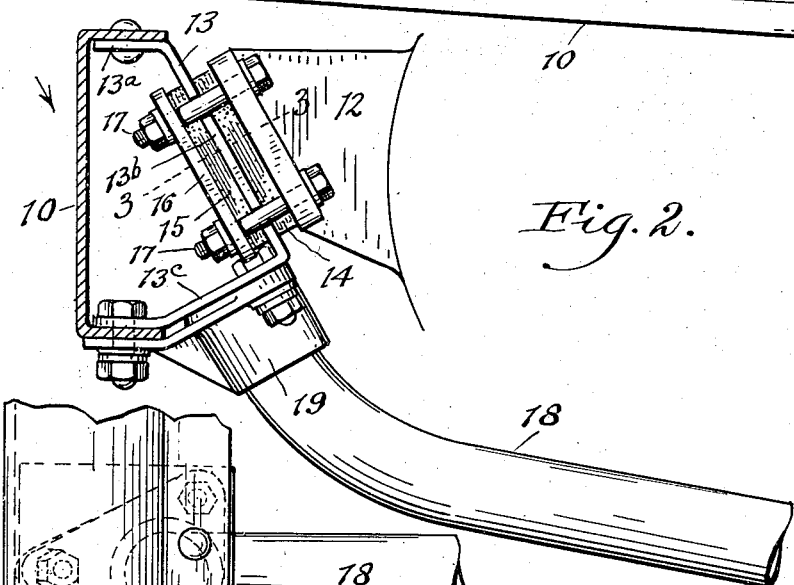
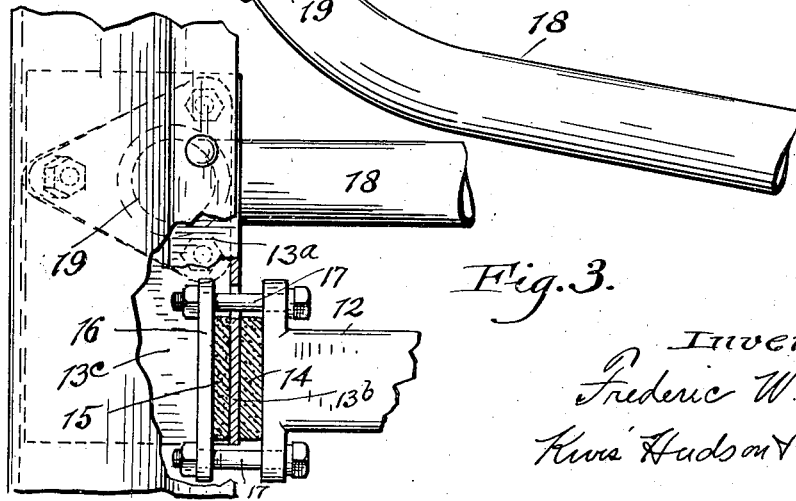
Inventor
Frederic W. Slack
Kwis Hudson & Kent
Attys Patented Oct. 9, 1928.

1,686,578

UNITED STATES PATENT OFFICE.

FREDERIC W. SLACK, OF CLEVELAND, OHIO, ASSIGNOR TO PEERLESS MOTOR CAR CORPORATION, OF CLEVELAND, OHIO, A CORPORATION OF VIRGINIA.

MOTOR SUPPORT OR SUSPENSION.

Application filed July 6, 1926. Serial No. 120,615.

This invention relates to an improved motor suspension for motor vehicles and has for its chief object to provide a suspension or motor support by which the motor is isolated or insulated from the motor frame so as to more effectively than heretofore prevent the transmission of mechanical vibration and noises from the motor to the chassis frame.

The invention may be briefly summarized as consisting in certain novel details of construction and combinations and arrangements of parts which will be described in this specification and set forth in the appended claims.

In the accompanying sheet of drawings, showing one embodiment of the invention which operates very effectively, Fig. 1 is a top plan view showing a portion of the chassis frame and showing conventionally the motor supported on the frame in accordance with my improved suspension, both the front and rear ends of the motor having, in this instance, the improved insulating or isolating support; Fig. 2 is a sectional view on an enlarged scale substantially along the line 2—2 of Fig. 1; and Fig. 3 is a view on a similar scale partly in elevation and partly in section looking in the direction indicated by the arrow in Fig. 2, the part in section being substantially along the line 3—3.

Referring now to the drawing, 10 represents the chassis frame and 11 the motor which is provided at its forward and rear ends with supporting arms 12, which are generally rigidly and directly secured to the chassis frame. My improved motor supporting means may be applied to one end of the motor only such as the rear end, or both to its forward and rear ends and in Fig. 1, it is so shown but it is to be understood that the invention may be employed for the rear end or, in fact, to either end of the motor only if desired.

In accordance with my invention, the motor arms 12 either at the front, rear, or at both the front and rear ends of the motor, are connected to the chassis frame in the following manner: A sheet steel supporting plate 13 is attached by riveting or bolting to the inside of the frame side channel, this member having the equivalent of flanges 13ª which engage the flanges of the frame side channel and, additionally, it has between the flanges 13ª two portions 13ᵇ and 13ᶜ which are on the inside of the frame channel, the portion 13ᵇ being inclined downwardly and inwardly away from the frame channel and the portion 13ᶜ downwardly and outwardly toward the frame channel. These two portions 13ᵇ and 13ᶜ are, in this instance, at right angles to each other but I do not regard that as a necessary relationship, the important feature being that the portion 13ᵇ to which the motor arm is attached is obliquely disposed with respect to the horizontal and vertical.

Two of these supporting members 13 are disposed on the opposite sides of the chassis frame preferably opposite the rear motor arms 12 and, in this instance, two are arranged opposite the front motor arms. The two rear plates are, in this instance, longer than the front plates for a purpose to be described.

The motor is supported between these angularly disposed members, there being interposed between the motor arms and the inclined portions 13ᵇ of the plates, resilient or insulating pads 14 such as rubber, fibre, wood, etc. but preferably the former. This serves to isolate or insulate the motor from the chassis frame so as to prevent the transmission of mechanical vibration and noises from the motor to the chassis frame. Inasmuch as the motor must now be securely attached to the chassis frame and the attachments must not form any direct mechanical contact between the motor and chassis frame, a second insulating pad 15 of similar material is placed on the outer side of the inclined portion 13ᵇ of the supporting member 13 and the parts are held in place by a steel plate 16 at the outer side of this pad and by attaching the bolts 17 extending through all these parts, including ears on the motor supporting arm. It is important that the attaching bolts clear the plate 13 so as to avoid mechanical contact between these parts, as shown in Fig. 3.

Inasmuch as the ordinary method of suspending the motor rigidly by attaching the rear motor arms to the chassis frame direct constitutes a very rigid tie up which stiffens the frame and protects the body of the car against stresses set up by the weaving of the frame, it is essential that the rigidity formerly secured by the rigid attachment of the rear motor arms to the frame be maintained or secured in some other manner. This result is accomplished in this case by the use of a rigid cross connecting member close to the rear motor arms, this member, in this instance, including a tubular cross piece 18 fastened by brazing, welding or otherwise into castings 19, bolted to the lower inclined faces 13ᶜ of the supporting plates. By thus rigidly connecting together the two opposite supporting plates 13 to which the rear motor arms are yieldingly attached, the necessary rigidity is obtained at this point.

The chassis frame generally has a front cross member 10ª which is sufficiently close to the front end of the motor to avoid the necessity of a special cross bracing member in the event my improved insulating supporting means is employed for the front end of the motor.

It will be observed that by the oblique or inclined arrangement of the yieldable insulating members, both horizontal and vertical stresses can be very effectively resisted, and, accordingly, not only is the motor isolated or insulated from the chassis frame but the arrangement of the supporting parts is such that stresses in any direction are successfully withstood and consequently, the motor suspension is very durable.

I do not desire to be confined to the precise details but aim in my claims to cover all modifications which do not involve a departure from the spirit and scope of my invention.

Having thus described my invention, I claim:

1. In combination with a chassis frame and motor, a suspension for the motor comprising diagonally disposed parallel abutments rigidly supported upon said frame and motor respectively, yieldable material interposed between said abutments, and holddowns for said motor abutments.

2. The combination with a chassis frame and motor, of a motor suspension comprising a supporting member on each side thereof disposed diagonally with respect to the horizontal and vertical, yieldable means between said members and the motor, and holddowns for said motor yieldably mounted with respect to the supporting members and rigidly connected with said motor.

3. A chassis comprising a chassis frame, a motor, plates secured to the side members of the chassis frame with supporting faces inclined to the horizontal and vertical and arranged on opposite sides of the motor, yieldable pads between said faces and the motor, and adjustable means for clamping down said motor on said pads.

4. A chassis comprising a chassis frame and a motor, the frame being provided on opposite sides of the motor with motor supporting plates having faces inclined downwardly and inwardly, pads of yieldable material on opposite sides of said plates, a motor arm above the upper pad, a rigid plate below the lower pad, and means for clamping said arm and rigid plate together and out of metal contact with said motor supporting plate.

5. A motor support for a chassis comprising a supporting member having downwardly and inwardly inclined upper and lower faces, a motor arm on one side of the member, a rigid plate on the other, yieldable pads on opposite sides of the supporting member, and bolts for clamping said arm and plate together and out of contact with the supporting member.

6. In a chassis, a chassis frame, a motor having oppositely disposed supporting arms, a pair of supporting plates secured to the chassis frame, the arms being yieldingly secured to these plates and a rigid member extending crosswise of the chassis frame and having its opposite ends secured to said plates.

7. A chassis having a frame and a motor, a pair of motor supporting plates secured to the inner sides of the opposite channels of the frame and having inclined faces secured to opposite sides of the motor with yieldable means between the motor and said faces, and a rigid member extending crosswise of the frame, adjacent the yieldable support thus provided.

8. A chassis comprising a frame and a motor, a pair of motor supporting plates secured to the inner sides of the side members of the frame and having faces disposed downwardly and inwardly and faces disposed downwardly and outwardly, the motor having arms yieldingly connected to the first-named faces of the plates and a rigid bracing member extending crosswise of the frame and attached to the second-named faces of the plates.

In testimony whereof, I hereunto affix my signature.

FREDERIC W. SLACK.